United States Patent [19]

Barbará et al.

[11] Patent Number: 5,649,023
[45] Date of Patent: Jul. 15, 1997

[54] METHOD AND APPARATUS FOR INDEXING A PLURALITY OF HANDWRITTEN OBJECTS

[75] Inventors: Daniel Barbará, Princeton; Walid Aref, New Brunswick; Ibrahim Kamel, Monmouth Junction; Padmavathi Vallabhaneni, Princeton, all of N.J.

[73] Assignee: Panasonic Technologies, Inc., Princeton, N.J.

[21] Appl. No.: 410,812

[22] Filed: Mar. 27, 1995

Related U.S. Application Data

[63] Continuation-in-part of Ser. No. 300,795, Sep. 2, 1994, Pat. No. 5,528,701, and Ser. No. 324,231, Oct. 17, 1994, Pat. No. 5,524,240, which is a continuation-in-part of Ser. No. 248,392, May 24, 1994, abandoned.

[51] Int. Cl.⁶ ................................................ G06K 9/62
[52] U.S. Cl. ........................................ 382/159; 382/226
[58] Field of Search ........................ 382/159, 160, 382/186, 187, 226, 227, 228, 229; 395/2.53, 2.63, 2.65, 601; 364/274.3, 274.4, 283.2, 926.8, 974.1, 974.3

[56] References Cited

U.S. PATENT DOCUMENTS

| | | | |
|---|---|---|---|
| 3,588,823 | 6/1971 | Chow et al. | 340/146.3 |
| 4,028,673 | 6/1977 | Taylor et al. | 340/146.3 R |
| 4,419,740 | 12/1983 | Hevenor, Jr. | 364/900 |
| 4,553,206 | 11/1985 | Smutek et al. | 364/300 |
| 4,601,012 | 7/1986 | Aiken, Jr. | 364/900 |
| 4,653,107 | 3/1987 | Shojima et al. | 382/13 |
| 4,718,102 | 1/1988 | Crane et al. | 382/13 |
| 4,975,975 | 12/1990 | Filipski | 382/38 |
| 4,989,258 | 1/1991 | Takahashi et al. | 382/37 |
| 5,014,327 | 5/1991 | Potter et al. | 382/14 |
| 5,033,087 | 7/1991 | Bahl et al. | 381/43 |
| 5,065,431 | 11/1991 | Rollett | 381/43 |
| 5,123,057 | 6/1992 | Verly et al. | 382/37 |
| 5,129,002 | 7/1992 | Tsuboka | 381/43 |
| 5,136,687 | 8/1992 | Edelman et al. | 395/22 |
| 5,151,950 | 9/1992 | Hullender | 382/13 |
| 5,194,852 | 3/1993 | More et al. | 345/182 |
| 5,202,986 | 4/1993 | Nickel | 395/600 |
| 5,226,091 | 7/1993 | Howell et al. | 382/3 |
| 5,241,619 | 8/1993 | Schwartz et al. | 395/2 |
| 5,267,327 | 11/1993 | Hirayama | 382/13 |
| 5,285,505 | 2/1994 | Kim et al. | 382/13 |
| 5,303,367 | 4/1994 | Leenstra, Sr. et al. | 395/600 |
| 5,321,833 | 6/1994 | Chang et al. | 395/600 |
| 5,379,422 | 1/1995 | Antoshenkov | 395/600 |
| 5,524,240 | 6/1996 | Barbara et al. | 395/600 |
| 5,528,701 | 6/1996 | Aref | 382/178 |
| 5,553,284 | 9/1996 | Barbara et al. | 395/600 |

OTHER PUBLICATIONS

Lopresti, D.P. & Tomkins, A., "Approximate Matching of Hand-Drawn Pictograms", IWFHR, III, Buffalo, NY, May 25-27, 1993 (pp. 102-111).

Lopresti, D.P. & Tomkins, A., "Pictographic Naming", INTERCHI '93 Adjunct Proceedings, Conf. on Human Factors in Computing Systems, (pp. 77–78), Apr. 1993.

(List continued on next page.)

*Primary Examiner*—Andrew Johns
*Attorney, Agent, or Firm*—Ratner & Prestia

[57] ABSTRACT

A method for indexing a plurality of handwritten objects is provided. A B-tree data structure of order m is generated, where m is an integer. The B-tree has a plurality of nodes divided into a plurality of levels ordinally numbered $0^{th}$ through $n^{th}$. Each node in the $0^{th}$ level is a leaf. Each node in the $1^{th}$ level has at least m/2 leaves as children. Each one of the handwritten objects is assigned to a respective leaf. A respectively different hidden Markov model (HMM) is associated with each respective child of each of the nodes in the $1^{th}$ to $n^{th}$ levels. Each one of the nodes in the $1^{th}$ to $n^{th}$ levels contains the respective HMM associated with the child of the one node. Each HMM in each one of the nodes in the $1^{th}$ level is trained to accept the handwritten object of the respective leaf that is a child of the one node. Each HMM associated with any of the nodes in the $2^{th}$ through $n^{th}$ levels is trained to accept all of the handwritten objects in the leaves of a subtree that has as a root the respective child with which the HMM is associated.

12 Claims, 6 Drawing Sheets

OTHER PUBLICATIONS

Kundu et al., "Handwritten Word Recognition Using HMM with Adaptive Length Viterbi Algorithm", IEEE, 1992, vol. 3, pp. 153–156.

Aref, W.G., Vallabhaneni, P. & Barbara, D., "Towards a Realization of Handwritten Databases: I Training and Recognition", MITL–TR–98–94, Matsushita Information Tech. Lab., Apr. 4, 1994 (pp. 1–18).

Aref, W.G., "The Handwritten Trie: An Indexing Method for Handwritten Databases", MITL–TR–107–94, Matsushita Information Tech. Lab., Apr. 29, 1994 (pp. 1–20).

Lopresti, D.P. & Tomkins A., "Pictographic Naming", MITL–TR–21–92, Matsushita Information Tech. Lab., Aug. 28, 1992 (pp. 1–18).

Lopresti, D.P. & Tomkins, A., "Applications of Hidden Markov Models to Pen–Based Computing", MITL–TR–32–92, Matsushita Information Tech. Lab., Nov. 9, 1992 (pp. 1–16).

Korth, H.F. & Silberschatz, A., "Database Concepts", McGraw–Hill, Inc., 1991, 2nd Ed., Chapter 4.2 (pp. 121–134).

Chen, M., Kundu, A., & Zhou, J., "Off–Line Handwritten Word Recognition (HWR) Using a Single Contextual Hidden Markov Model". IEEE, 1992 (pp. 669–672).

Kundu, A. & Bahl, P., "Recognition of Handwritten Script: A Hidden Markov Model Based Approach", M4.20, IEEE 1988, (pp. 928–931).

Vlontzos, J.A. & Kung, S.Y., "A Hierarchical System for Character Recognition", ISCAS, IEEE, 1989 (pp. 1–4).

Yamato, J., Ohya, J. & Ishii, K., "Recognizing Human Action in Time–Sequential Images using Hidden Markov Model". IEEE, 1992 (pp. 379–385).

Vrbsky S.V. & Liu, J.W.S., "APPROXIMATE—A Query Processor That Produces Monotonically Improving Approximate Answers", IEEE Transactions on Knowledge & Data Engineering, vol. 5, No. 6, Dec. 1993 (pp. 1056–1068).

ZLoof, M.M., "Query–by–Example: a data base language", IBM Syst. J. No. 4, 1977 (pp. 324–343).

Bose, C.B. & Kuo, S., "Connected and Degraded Text Recognition Using Hidden Markov Mode"l, IEEE 1992 (pp. 116–119).

Tappert, C.C., Suen, C.Y. & Wakahara, T., "The State of the Art in On–Line Handwriting Recognition", IEEE Transactions on Pattern Analysis & Machine Intelligence, vol. 12, No. 8, Aug. 1990 (pp. 787–808).

Barbará, D., Garcia–Molina, H. & Porter, D., "The Management of Probabilistic Data", IEEE Transactions on Knowledge & Data Engineering, vol. 4, No. 5, Oct. 1992 (pp. 487–502).

Stonebraker, M., Jhingran, A., Goh, J. & Potamianos, S., "On Rules, Procedures, Caching and Views in Data Base Systems", ACM 1990 (pp. 281–290).

Barbará, D. & Alonso, R., "Processing Continuous Queries in General Environments", Matsushita Information Tech. Lab., Jun. 4, 1993 (pp. 1–30).

Lopresti, D. & Tomkins A., "A New Paradigm for Pen Computing", MITL–TR 71–93, Matsushita Information Tech. Lab., Oct. 14, 1993 (pp. 1–16).

F. Jelinek, "Continuous Speech Recognition by Statistical Methods", *Proceedings of the IEEE*, vol. 64, No. 4, pp. 532–556 (Apr. 1976).

B.K. Sin et al., "A Statistical Approach with HMMs for On–Line Cursive Hangul (Korean Script) Recognition", *IEEE International Conference on Document Analysis and Recognition*, pp. 147–150 (Oct. 1993).

E. Fredkin et al., "Trie Memory", *Communications of the ACM*, vol. 3, No. 9 pp. 490–500 (Sep. 1960).

A.J. Viterbi, "Error Bounds for Convolutional Codes and an Asymptotically Optimum Decoding Algorithm", *IEEE Transactions on Information Theory*, vol. IT–13, No. 2, pp. 260–269 (Apr. 1967).

A.B. Poritz, "Hidden Markov Models: A Guided Tour", *IEEE International Conference on Acoustics, Speech, and Signal Processing*, vol. 1, pp. 7–13 (Apr. 1988).

METHOD AND APPARATUS FOR INDEXING A PLURALITY OF HANDWRITTEN OBJECTS

This application is a Continuation-in-part of application Ser. No. 08/300,795, filed Sept. 2, 1994, now U.S. Pat. No. 5,528,701 and of application Ser. No. 08/324,231, filed Oct. 17, 1994, now U.S. Pat. No. 5,524,240, which is a continuation-in-part of Ser. No. 08/248,392, filed May 24, 1994, abandoned in view of Ser. No. 08/469,803, filed Jun. 6, 1995 now U.S. Pat. No. 5,553,284.

FIELD OF THE INVENTION

The present invention relates to methods and apparatus for handling handwritten data objects.

BACKGROUND OF THE INVENTION

Electronic pictures and handwritten documents are entering common use in computers due to the introduction of pen based interfaces. Recent products have replaced the keyboard entirely by a pen with which all data entry is performed.

In a paper by D. Lopresti, and A. Tomkins, entitled "Pictographic Naming", INTERCHI '93 Adjunct Proceedings, April, 1993 (which is incorporated herein by reference for its teachings on use of pictographic names), the authors propose extending the range of acceptable document names to include arbitrary hand-drawn pictures. When a document is created or first stored in a storage medium, the author draws a pictographic name instead of typing in a textual name. To subsequently retrieve one of the documents, the pictographic names may be displayed in a menu or "browser", and the user selects the desired pictographic name.

If the database includes more than about 8–12 documents, it becomes impractical to display all of the pictographic names during retrieval.

In an alternative method to subsequently retrieve one of the documents, the pictographic name is redrawn using a pen based interface. Because the hand-drawn pictures are not drawn in exactly the same way each time, a pattern recognition technique is needed to determine which document (or output sequence) a given hand-drawn picture (or input sequence) is intended to represent.

One of the proposed techniques for identifying a document by its pictographic name involves the use of Hidden Markov Models (HMM) to provide a list of candidate documents that have pictographic names most closely resembling the input sequence. From this list, one file is selected using the pen. HMMs provide a powerful tool for picture and handwritten document matching. Several researchers have used HMMs to model handwriting and handwritten documents.

Rabiner, L. R., "A Tutorial on Hidden Markov Models and selected Applications in Speech Recognition", Proceedings of the IEEE, 77(2):257–285, February 1989, is incorporated by reference herein for its teachings on the use of Hidden Markov Models for pattern recognition.

Formally, an HMM is a doubly stochastic process that contains a non-observable underlying stochastic process (hidden) that is uncovered by a set of stochastic processes that produce the sequence of observed symbols. Mathematically an HMM is a tuple $<\sigma, Q, a, b>$, where 1) $\sigma$ is a (finite) alphabet of output symbols. A symbol is typically a subset of a character (i.e., a stroke).

2) Q is a set of states, $Q=\{0 \ldots, N-1\}$ for an N-state model.

3) a is a probability distribution that governs the transitions between states. The probability of going from state i to j is denoted by $a_{ij}$. The transition probabilities $a_{ij}$ are real numbers between 0 and 1, such that:

$$\text{for all } i \in Q: \sum_{j=0}^{N-1} a_{ij} = 1 \qquad (1)$$

The distribution includes the initial distribution of states, that is the probability $a_i$ of the first state being i.

4) b is an output probability distribution $b_i(s)$ that governs the distribution of output symbols for each state. That is, $b_i(s)$ is the probability of producing the symbol $s \in \sigma$ G while being in state i. These probabilities follow the rules:

$$\text{For all } i \in Q \text{ and } s \in \sigma: 0 < b_i(s) \leq 1 \qquad (2)$$

$$\text{For all } i \in Q, \Sigma_{s \in \sigma} b_i(s) = 1 \qquad (3)$$

Usually, when HMMs are used, the transition probabilities (a) and the state set (Q) are computed by bestfitting the model to a series of samples. (This is known as training the model). Each sample consists of a sequence of output symbols (points), with which the parameters of the model may be adjusted. However, in applications such as recognition of handwritten documents, the model is described using a single sample (a sequence of output symbols for the document that is to be indexed). Quite commonly, then, the structure of the model is "fixed" to make up for the lack of samples with which to train it. That is, once a model is selected for an index, that model is used for the life of the index. The model is not changed dynamically after the index is created. For example, a left-to-right HMM may be used, i.e. a model in which it is only possible to remain in the current state or to jump to the next state in sequence.

For the handwritten object matching problem, each pictograph or handwritten object in the database is modeled by an HMM. As a result, given an input pattern, the recognition process involves executing each HMM in the database and selecting the one that generates the input pattern with highest probability. This is very time consuming. The primary impediment to using HMMs is execution speed, especially in the context of large databases. Executing a respective HMM for each object in the database in real-time to match an input data sequence to one of the objects introduces an unacceptable delay, making the use of pictographic names by this method impractical.

SUMMARY OF THE INVENTION

The present invention is a method for indexing a plurality of handwritten objects.

A B-tree data structure of order m is generated, where m is an integer. The B-tree has a plurality of nodes divided into a plurality of levels ordinally numbered $0^{th}$ through $n^{th}$. Each node in the $0^{th}$ level is a leaf. Each node in the $1^{st}$ level has a respective leaf as a child.

Each one of the handwritten objects is assigned to a respective leaf.

A respectively different hidden Markov model (HMM) is associated with each respective child of each of the nodes in the $1^{st}$ to $n^{th}$ levels. Each one of the nodes in the $1^{st}$ to $n^{th}$ levels contains the respective HMM associated with the child of the one node.

Each HMM in each one of the nodes in the $1^{th}$ level is trained to accept the handwritten object of the respective leaf that is a child of the one node.

Each HMM associated with any of the nodes in the $2^{th}$ through $n^{th}$ levels is trained to accept all of the handwritten objects in the leaves of a subtree that has as a root the respective child with which the HMM is associated.

OVERVIEW

The invention is a method and apparatus for indexing a plurality of documents in a database. Each document is represented by a handwritten object; the objects are indexed in a balanced B-tree. Preferably, the invention is used in a personal digital assistant, or other microcomputer having a pen-based interface for entering handwritten data objects.

Figure 1:
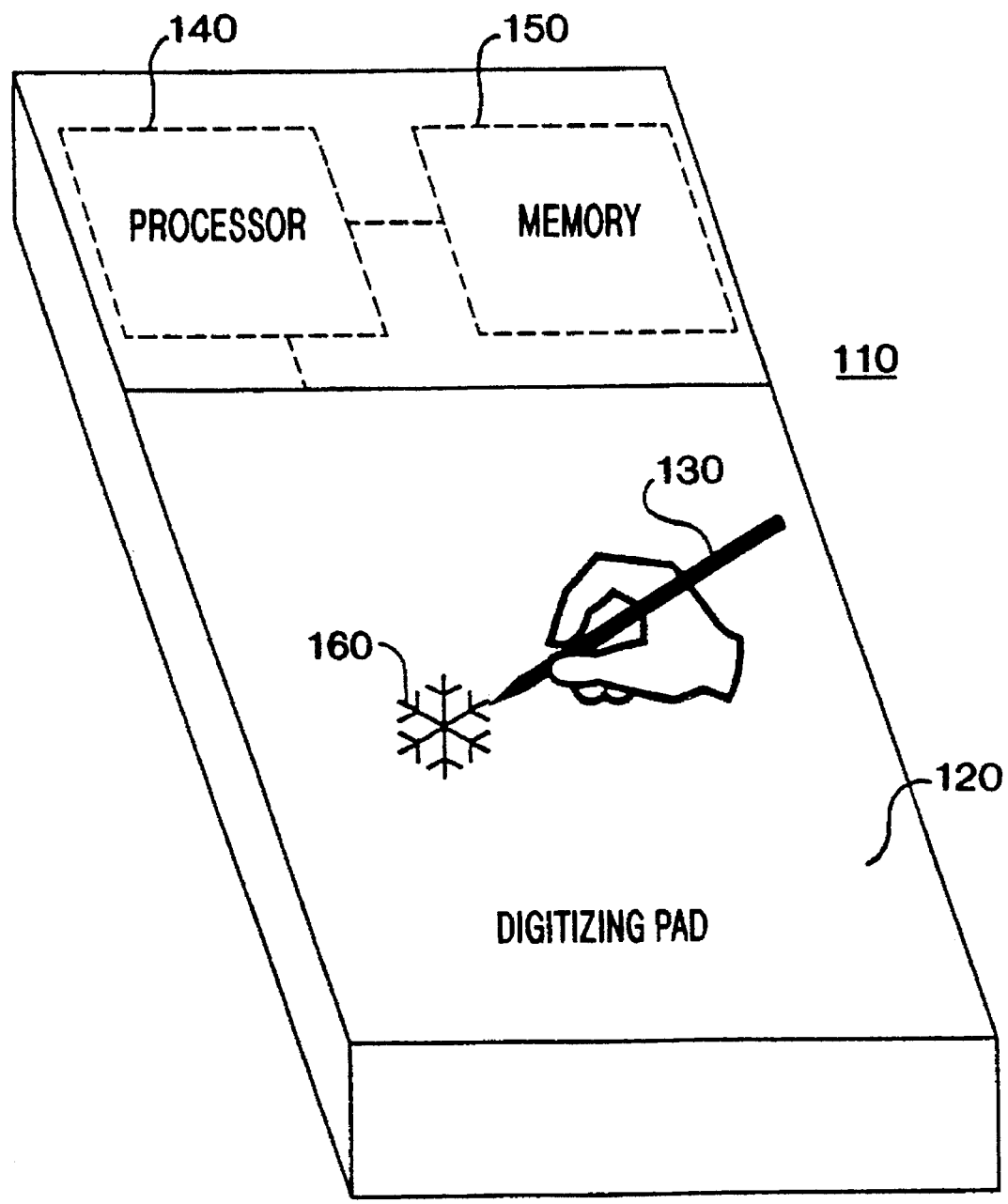
FIG. 1 is a block diagram of an exemplary apparatus for practicing the invention.

FIG. 1 is a diagram showing an exemplary personal digital assistant (PDA) 110 in which the invention may be used. The PDA 110 has a digitizing pad 120. The digitizing pad 120 detects movement of a stylus 130 and provides signals representing X-Y coordinates of the stylus 130 to a processor 140. The processor 140 a performs a conventional feature extraction process to determine the symbols represented by the movement of the stylus. The symbols may be feature vectors.

Once features are extracted, the features are analyzed using hidden Markov Models (HMMs). During a document insertion operation, an HMM is trained to accept the new handwritten data object (pictograph) which represents the document; the pictograph and the HMM are stored in a B-tree data structure in a memory 150. Memory 150 may be the hard disk drive of the PDA 410, or other storage medium. The invention allows pictographs to be inserted with only a relatively small subset of the HMMs being retrained.

Subsequently, during a query or retrieval operation, the user enters an input data sequence using stylus 130 and digitizing pad 120. A subset of the HMMs are run against the input data sequence, and the HMMs that exhibit the closest matches to the input data sequence are identified as being found by the query operation. The objects found by the query may be displayed in a browser, from which the user selects the document to be retrieved. In this manner, queries may be executed by running only a small subset of the HMMs against the input data sequence.

Figure 2:
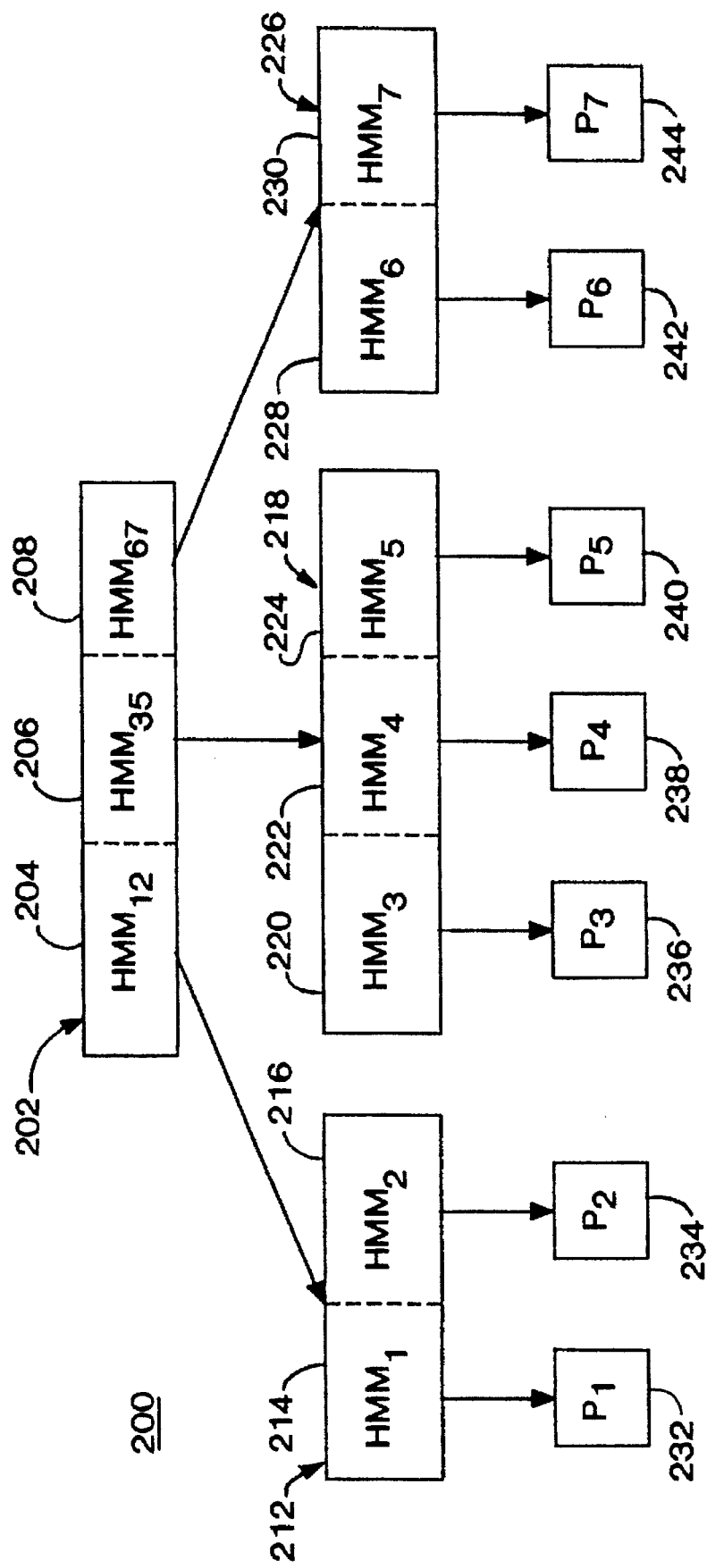
FIG. 2 is a diagram of an exemplary B-tree data structure used in the apparatus of FIG. 1.

FIG. 2 is a block diagram of an exemplary B-tree data structure 200 according to the invention. A plurality of handwritten data objects (e.g., object 160 in FIG. 1) are stored in the B-tree 200, each object being the "title" of a document. The B-tree 200 also contains a plurality of hidden Markov models (HMMs) used to structure the index and to match an input data string to one of the handwritten objects.

The B-tree 200 has a plurality of nodes divided into a plurality of levels ordinally numbered $0^{th}$ through $n^{th}$, where the $n^{th}$ level has the root node and the $0^{th}$ level has the leaves. In FIG. 2, n equals two, but the invention may be practiced with larger values of n. Each node 232–244 in the $0^{th}$ level is a leaf. The B-tree 200 is of order m (where m is an integer), meaning that every node, except the root 202 and the leaves 232–244 has at least m/2 children. Every node in the tree 200 except for the leaves 232–244 has a number of children that is equal to or less than m. In FIG. 2, m equals three, but the invention may be practiced with larger values of m. All of the leaves 232–244 appear on the same level (the $0^{th}$ level). A non-leaf node on the $k^{th}$ level has k–1 keys.

Every leaf 232–244 of tree 200 contains a pictogram (e.g., a handwritten data object). The nodes 212, 218 and 226 in the $1^{th}$ level (those nodes which are the parents of the leaf nodes 232–244) contain HMMs. There is a one-to-one correspondence between the HMMs in the $1^{th}$ level and the handwritten data objects in the $0^{th}$ level. Each HMM in the $1^{th}$ level is trained to accept the respective pictogram stored in the corresponding leaf node that is the child of the node containing that HMM.

For example, node 212 has two HMMs, $HMM_1$ and $HMM_2$, stored in respective memory elements 214 and 216. $HMM_1$ is associated with the leaf node 232, which contains handwritten data object (pictogram) P1, and is trained to accept P1. $HMM_2$ is associated with the leaf node 234, which contains pictogram P2, and is trained to accept P2. Similarly, the HMMs ($HMM_3$, $HMM_4$ and $HMM_5$) in node 218 are associated with and trained to accept the handwritten data objects 236, 238 and 240, respectively; the HMMs ($HMM_6$ and $HMM_7$) in node 226 are associated with and trained to accept the handwritten data objects 242 and 244, respectively.

Every non-leaf node in levels 1 through n has a respectively different HMM for each child node. Nodes 212, 218 and 226 in level 1 have already been described. In level 2 of the exemplary B-tree 200, node 202 has three HMMs, $HMM_{12}$, $HMM_{35}$ and $HMM_{67}$, corresponding to child nodes 212, 214 and 216, respectively. Every non-leaf node in levels 2 through n–1 is the root of a respective subtree. Each HMM in levels 2 through n–1 is trained to accept every pictogram in the leaves of the subtree that has as a root the child node with which that HMM is associated.

For example, $HMM_{12}$ in node 102 is associated with child node 212. Child node 212 is the root of a subtree that has two leaf nodes, 232 and 234. $HMM_{12}$ is trained to accept all of the leaves 232 and 234 in the subtree that has node 212 as a root. $HMM_{35}$ in node 202 is associated with child node 218. $HMM_{35}$ is trained to accept all of the leaves 236, 238 and 240 in the subtree that has node 218 as a root. $HMM_{67}$ in node 202 is associated with child node 226. $HMM_{67}$ is trained to accept all of the leaves 242 and 244 in the subtree that has node 226 as a root.

Figure 3B:
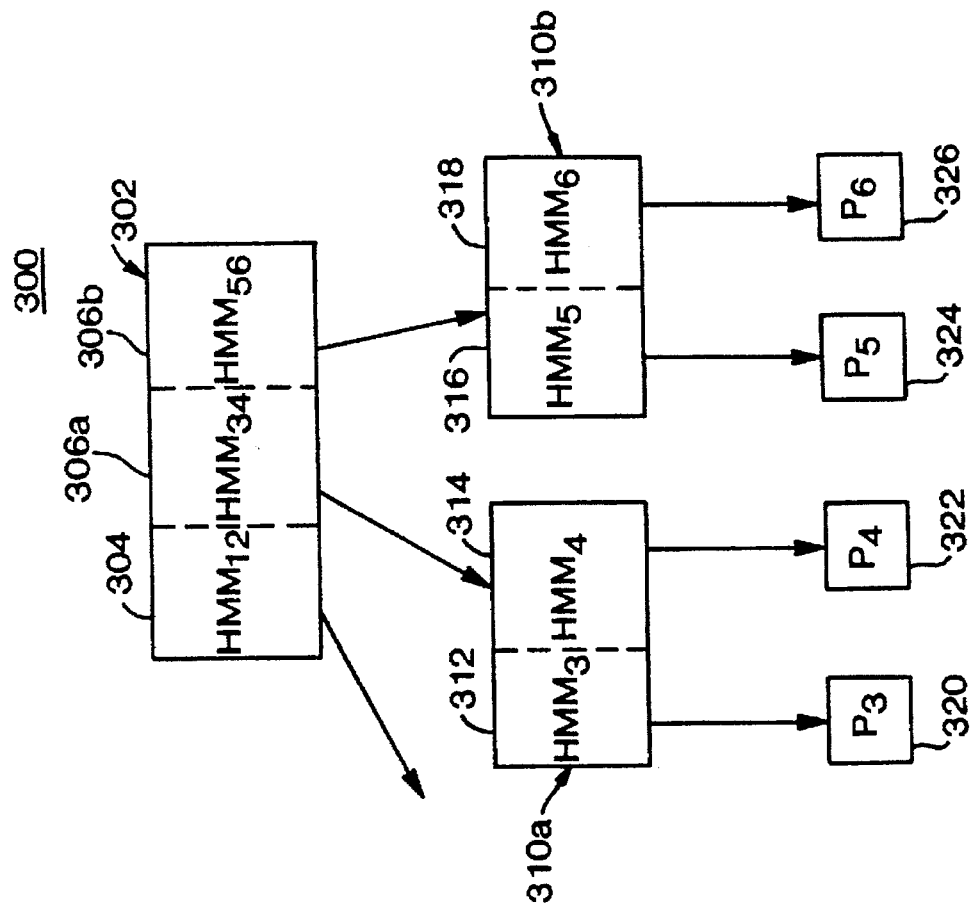
FIGS. 3A and 3B are diagrams of a portion of a B-tree data structure used in the apparatus of FIG. 1, before and after addition of a node, respectively.
Figure 3A:
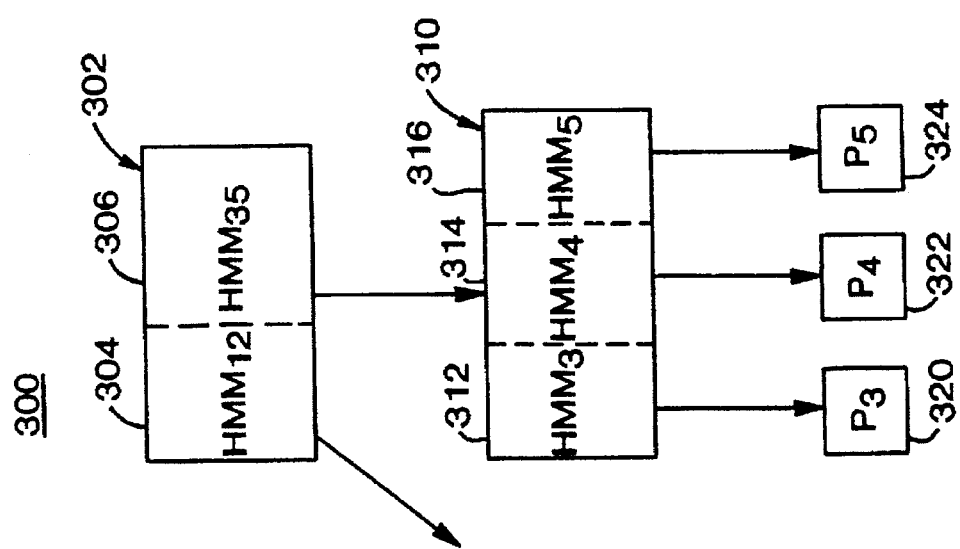

FIGS. 3A and 3B are block diagrams showing how nodes are added to the B-tree 300 upon insertion of additional handwritten objects. Tree 300 is another example of a tree of the same type as tree 200 (FIG. 2).

FIG. 3A shows a portion of a B-tree 300 of order 3, including a root node 302, a $1^{th}$ level node 310 and three leaves 320, 322 and 324. The root node 302 includes two HMMs, $HMM_{12}$ and $HMM_{35}$. $HMM_{35}$ is associated with node 310. Node 310 has three HMMs ($HMM_3$, $HMM_4$, and $HMM_5$) associated with leaves 320, 322 and 324 respectively. Because B-tree 300 is of order 3, none of the nodes can have more than three children. Node 310 already has as many children as it can accommodate. Assume that a new object P6 (shown in FIG. 3B) and its associated HMM ($HMM_6$) are to be added to the B-tree, and assume that $HMM_{35}$ has a greater probability of outputting P6 than $HMM_{12}$. Under these circumstances, it is not possible to associate another leaf with node 310, because node 310 would then have more than m (three) children. Instead, node 310 is split as shown in FIG. 3B.

FIG. 3B shows how the object P6 and $HMM_6$ are added. The node 310 is split into two nodes. A new node 310b is added, and the new HMM ($HMM_6$) is added to the new node 310b. Half of the HMMs ($HMM_3$ and $HMM_4$) in the original node 310 are retained in the node 310a, along with pointers to the child nodes 320 and 322, respectively, associated with the retained HMMs. The other half of the HMMs ($HMM_5$) in original node 310 are transferred to the new node 310b. The nodes associated with $HMM_5$ and $HMM_6$ become the children of node 310b.

Once the new node 310b is added, a new HMM ($HMM_{56}$) is added to node 302. In the example of FIG. 3B, node 302 is able to accommodate the additional HMM ($HMM_{56}$) and the additional child node 310b without exceeding the limit of three children. If, however, node 302 already had three children, then addition of a node on the $1^{th}$ level would require the addition of a node in the $2^{th}$ level.

This splitting of nodes may propagate up the tree if the nodes in the higher levels already have m children. One of ordinary skill in the art will readily understand that when the root node 302 (the $n^{th}$ level node) already has a number of children equal to the order m of the tree 300, splitting of the root node 302 to accommodate an additional node in the $n-1^{th}$ level requires the addition of an $n+1^{th}$ level to the tree 300. The $n+1^{th}$ level will have a single node which is a new root node of tree 300.

When all of the new nodes are added, each HMM in each node in each path from the root node to an added leaf is retrained to accept the added object, so that each HMM accepts the objects in each leaf in a subtree that has as a root the child associated with that HMM.

Optionally, all of the HMMs in a path from the root node 302 to the node 310a that was split may also be retrained to accept only the objects P3 and P4 remaining in children of the node 310a. This optional step should decrease subsequent search time.

DETAILED DESCRIPTION

Figure 4:
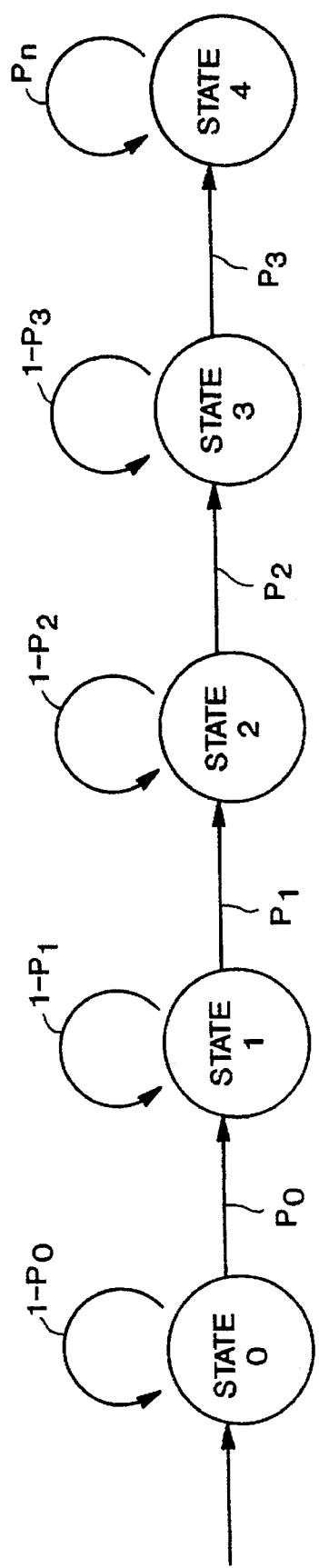
FIG. 4 is a state diagram of an exemplary hidden Markov model used in the indices shown in FIGS. 2, 3A and 3B.

FIG. 4 is a state diagram of a hidden Markov model used in the exemplary information tree of FIG. 2.

To insert a document in the document database, the handwritten object representing the document is entered in the index. A set of T output symbols are extracted from the object. The hand-drawn figure is divided into points, and each point is represented by a symbol. In the exemplary symbol alphabet, four features are extracted per point: direction, velocity, change of direction and change of velocity. Each feature is drawn from a set of four possible values, hence the feature vector (symbol) for a point is represented using four pairs of bits. In the exemplary symbol alphabet, each one of the output symbols in σ is described by an eight bit vector value. It is contemplated that other equivalent symbol alphabets may be used. For example, a symbol may be a line segment or arc.

It is presumed that the individual symbols are detected by a conventional technique, such as a pen based interface. In the exemplary embodiment, once the individual symbols are detected, a left-to-right HMM is used to analyze the symbols. A left-to-right HMM is a model in which it is only possible to remain in the current state or to jump to the next state in sequence. An example of such an HMM is shown in FIG. 4. This model contains 5 states numbered from 0 to 4. In the exemplary HMM, the probability $p_i$, of jumping from state i to state i+1 is 0.5 for $0 \leq i \leq n-1$, while the probability of staying in the same state $(1-p_i)$ is 0.5. The probability $P_n$ of staying in the last state, once it is reached, is 1.0. It is understood by one skilled in the art that other HMMs may be used, so long as the selected HMM remains fixed throughout the life of the index and is not dynamically changed.

Each level K ($0 \leq K \leq T$) in the tree is assigned a respective minimum probability value $\epsilon_K$ ($0 \leq \epsilon_K \leq 1$). The respective minimum probability values may differ at each level.

Figure 5:
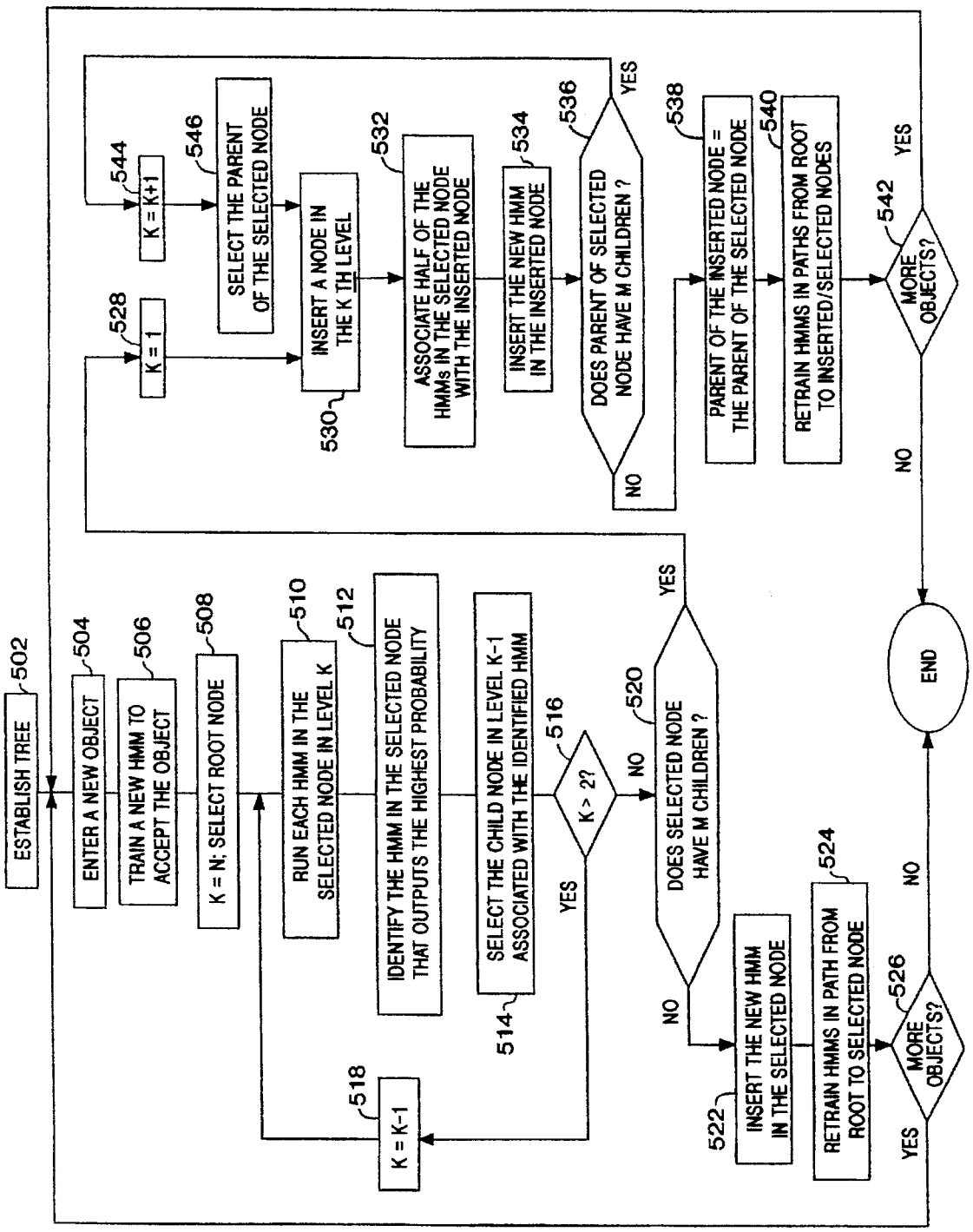
FIG. 5 is a flow chart diagram showing the exemplary method for generating the index shown in FIG. 2.

FIG. 5 is a flow chart diagram of an exemplary method for building an index according to the invention. Where possible, reference is made to the nodes and HMMs in the example of FIGS. 3A and 3B throughout the description of FIG. 5.

At step 502, a B-tree data structure 300 of order m is established, where m is an integer (m equals 3 in the example). Initially, the tree has at least one node (the root node) and one leaf, in which an object is to be stored. The node has a pointer to the leaf. An additional leaf is created for each object added to the index, and additional nodes are added as necessary, as explained below. Each time a leaf is added, a pointer to the leaf is added to the node. When the $m+1^{th}$ object is added to the index, an additional level of nodes (the $1^{th}$ level) is required between the root (the $n^{th}$ level) and the leaves (the $0^{th}$ level). After the addition of the $1^{th}$ level of internal nodes, the B-tree has a plurality of nodes divided into a plurality of levels ordinally numbered $0^{th}$ through $n^{th}$. Each node 320, 322, 324 in the $0^{th}$ level is a leaf. Each node in the $1^{th}$ level (only node 310 is shown) now has at least m/2 leaves as children.

At step 504, a new pictogram is entered. For example, a data object $P_6$ may be written in by hand on digitizing pad 120. The new handwritten object $P_6$ is assigned to a respective leaf 326.

At step 506, a new HMM ($HMM_6$) is trained to accept the new handwritten object $P_6$. At this point, a determination has not yet been made as to where this new HMM is stored.

At step 508, the process of determining where to place the new HMM is initiated, beginning by selecting the root node 302 (the node in the $N^{th}$ level) of tree 300.

At step 510, each HMM ($HMM_{12}$ and $HMM_{35}$) in the selected node 302 is run against the new object $P_6$ to determine the probability of that HMM outputting the new object. In the example, $HMM_{35}$ has the higher output probability.

At step 512, the HMM ($HMM_{35}$) in the selected node 302 that provides the highest probability for the new object $P_6$ during step 510 is identified.

At step 514, the child node 310 that is associated with the HMM ($HMM_{35}$) identified in step 512 is selected.

At step 516, if the processing is being carried out on the nodes of a level above the $2^{th}$ level, then at step 518, processing proceeds to the next lower level and returns execution to step 510.

At step 516, if processing is being performed on the nodes of the $2^{th}$ level, then the new HMM ($HMM_6$) is inserted on the $1^{th}$ level.

At step 520, if the selected node in the $1^{th}$ level has fewer than m children, the new HMM is simply added to the selected node at steps 522–526. If, at step 520, the selected node in the $1^{th}$ level already has m children, then the selected node is split into two nodes in the $1^{th}$ level, in steps 528–534. In the example, node 310 already has 3 children, so node 310 is split into nodes 310a and 310b in steps 528–534, as described later.

First with reference to the case in which the selected node in the $1^{th}$ level has fewer than m children, step 522, the new HMM is inserted in the selected node.

At step 524, all of the HMMs in a path from the root node 202 to the leaf in which the new pictogram is stored are retrained, so that each HMM accepts all of the pictograms in the leaves of a subtree that has, as a root, the child with which the HMM is associated. For example, if a new HMM were inserted in node 212 of FIG. 2 (associated with a new pictogram in a new child of node 212), then $HMM_{12}$ in node 202 would be retrained to accept P1, P2 and the new pictogram.

At step 526, if more objects are to be indexed in the tree, then step 504 is executed.

Second, with reference to the case in which the selected node 310 in the $1^{th}$ level has m children when step 520 is executed, control is transferred to step 528.

At step 528, the counter K is set to 1.

At step 530, a new node 310b is inserted in the $K^{th}$ level.

At step 532, half of the HMMs in the selected node 310 are associated with the node 310b inserted in step 530 (i.e., the pointers associated with the HMMs in node 302 are changed from the selected node 310 to the inserted node 310b). If m is an odd integer, then at the end of this step, one of the group consisting of the selected node and the inserted node will have (m-1)/2 HMMs, and the other node will have (m+1)/2 HMMs. In the example of FIG. 3B, m equals 3, and the inserted node 310b has 1 HMM after step 532. Hereafter, the selected node 310 is referred to as node 310a, to indicate that half of the HMMs have been removed from node 310a.

At step 534, the new HMM ($HMM_6$) trained in step 506 is stored in the inserted node 310b.

At step 536, a determination is made whether the parent 302 of the selected node 310a has m children. If the parent already has m children, step 544 is executed, as explained below. In the example, parent node 302 only has two HMMs ($HMM_{12}$ and $HMM_{35}$) at this point, so step 538 is executed.

At step 538, if the parent 302 of the selected node 310a has fewer than m children, a pointer is added to the parent 302, so that the parent 302 of the inserted node 310b is the same as the parent of the selected node 310a. A new HMM ($HMM_{56}$) is added in the parent node 302 of the selected node 310a.

At step 540 all of the HMMs in a path from the root node 302 to the inserted node 310b are retrained to accept the new object P6, as well as the previous leaves in the corresponding subtrees. In the example, $HMM_{56}$ is trained to accept P5 and P6. Optionally, all of the HMMs in a path from the root node 302 to the selected node 310a may also be retrained to accept only the objects P3 and P4 remaining in children of the selected node 310a. This optional step increases the insertion time for a new object, but should decrease the search time because fewer HMMs will be executed during search.

At step 542, if there are more objects to add, step 504 is executed again.

If, at step 536, the parent node of the selected node already has m children, it is not possible to add another pointer in the parent node pointing to the inserted node; it is necessary to split the parent node of the selected node. Step 544 is executed.

At step 544, the level K is incremented by one.

At step 546, the parent of the selected node is selected, so that the parent node may be split. Then steps 530–536 are executed, to split the parent node. Steps 544, 546 and 530–536 are repeated until both of the following conditions are true: (1) The is a complete path the root 302 to the leaf 326 containing the new object (The path is defined by the pointers associated with each HMM in each node of the path); and (2) none of the nodes has more than m HMMs.

FIG. 3B shows that root node 302 has three HMMs. One of ordinary skill in the art will readily understand that the addition of another node in the $1^{th}$ level (not shown) requires splitting of the root node 302, and the creation of a new root node in an additional level (not shown).

Figure 6:
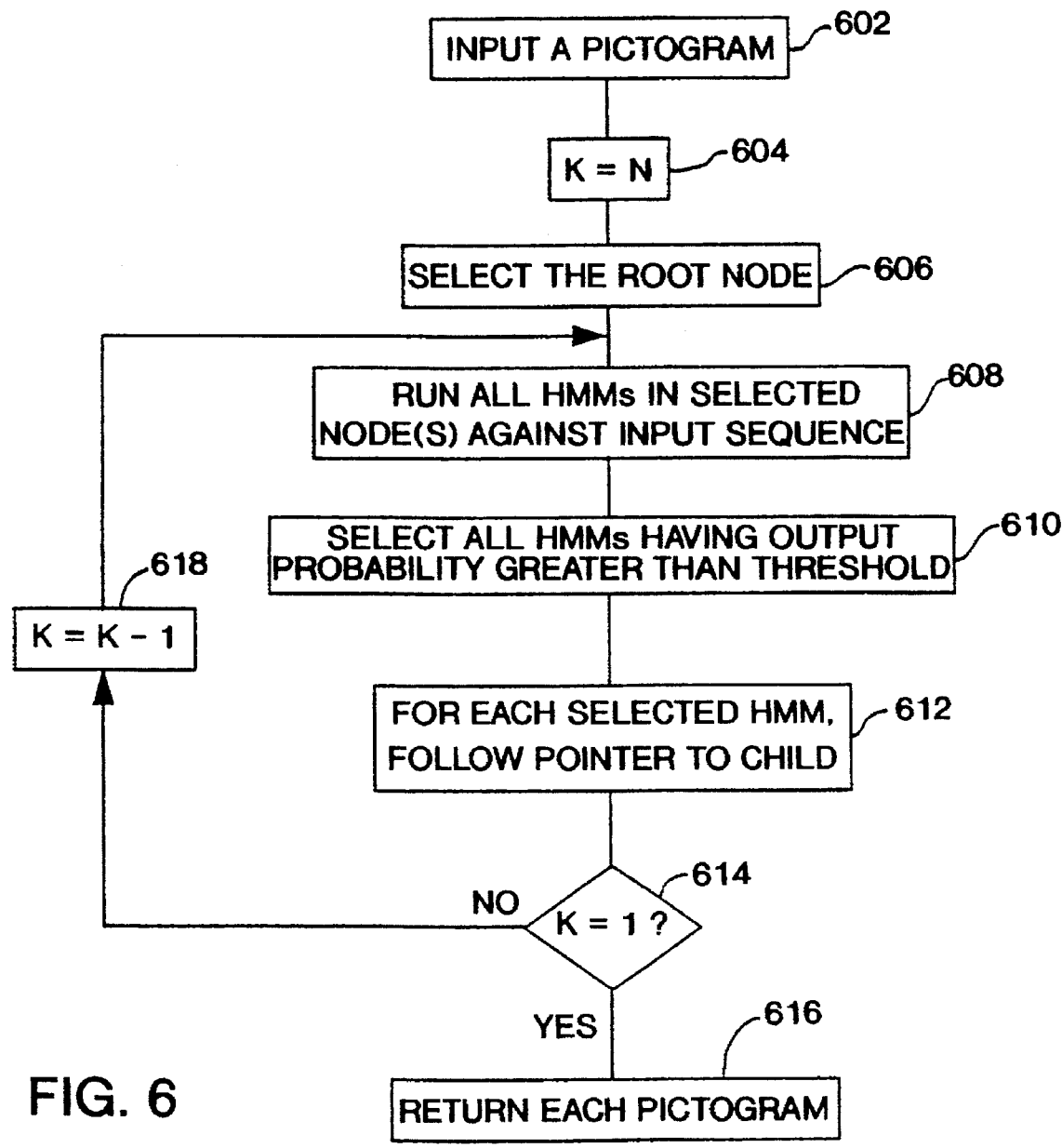
FIG. 6 is a flow chart diagram showing the exemplary method for searching the index shown in FIG. 2.

FIG. 6 is a flow chart diagram showing how the index is searched when retrieving a document from the database.

At step 602, the user enters a handwritten object which resembles the pictographic name of one of the documents on the digitizing pad 120 (FIG. 1). The features of the object so entered are extracted and form the input sequence for the query.

At step 604, the search begins at the $N^{th}$ level. At step 606, the root node is selected.

At step 608, all of the HMMs in the selected node are run against the input sequence, to determine the probability of each HMM outputting the input sequence. Each HMM may have a respectively different probability.

At step 610, the probabilities determined in step 608 are compared to the threshold probability for level K, and each HMM having an output probability that is greater than or equal to the threshold probability is selected.

At step 612, for each HMM selected in step 610, the respective pointer is followed to the child node with which that HMM is associated.

At step 614, if K equals one (the $1^{th}$ level), then the children of the selected nodes are the leaves, and step 616 is executed.

At step 616, the pictograms in the leaf nodes are identified as being found by the query, and all are found pictograms are displayed. Preferably, the pictograms are displayed in a browser, from which the user may select the pictogram representing the desired document.

If at step 614, K is greater than 1, then step 618 is executed.

At step 618, K is decremented by 1 (processing proceeds to the next lower level of the index). Execution then passes to step 608.

The B-HMM tree 200 (FIG. 2) has the following advantages:

Tree 200 provides an orderly method and apparatus for minimizing the number of HMMs that must be run against any given input data pattern during searching to find the stored pictogram (handwritten data object) that most closely matches the input data pattern. At each level, the HMMs in a given node are only executed if the associated HMM in the parent of that node indicates a predetermined minimum threshold output probability. At every level, subtrees are eliminated from the search if the respective HMMs associated with those subtrees indicate less than the threshold output probability. By executing fewer HMMs, the query time is reduced.

Also, the B-HMM tree 200 is space efficient. The size of the tree 200 is determined by the variable m and the number of objects in the index. Once m is defined, the number of levels N is automatically determined by m and the number of objects. The number of nodes in the tree 200 is given by $m^N$. Thus, the size of the index is fairly insensitive to the number of symbols in the alphabet. This space saving is advantageous. A co-pending application, Ser. No. 08/248,392, filed May 24, 1994, is expressly incorporated by reference for its teachings on indexing methods for electronic handwritten documents. In that application, two of the inventors of the present invention provide an index that is designed to minimize search time by eliminating the need to execute HMMs during the search. However, that index grows very large as the number of symbols in the alphabet and the number of symbols in the input sequence grows. The present invention requires execution of a subset of the HMMs during search, but may use much less space than the method of Ser. No. 08/248,392.

A further co-pending application, Ser. No. 08/300,795, filed Sep. 2, 1994 is expressly incorporated herein by reference for its teachings on the use of a compact Trie data structure for indexing handwritten text entries in a database. Ser. No. 08/300,795 teaches segmenting the sequences of symbols, which may result in a more compact index, at the expense of greater insertion time.

In the present invention, selection of the parameter m is important to the performance of the system. If m is too high, it becomes difficult to train each HMM at the higher levels of the tree 200 to accept all of the handwritten objects in the leaves of each subtree that has as a root the respective child with which the HMM is associated. (The number of pictograms that an HMM must accept may be as high as $m^N$). On the other hand, as m grow, the space taken by the tree is less (because fewer levels are needed and, therefore, less space is occupied by intermediate nodes and their HMMs.

Although the invention has been described in terms of its application to indexing a plurality of documents in a database, it may be applied to databases having other non-traditional objects. For example, the invention may be used for indexing a database in which the database objects have attributes which are handwritten entities. Such a database is described in copending application Ser. No. 08/324,231, filed Oct. 17, 1994, which is expressly incorporated by reference for its teachings on methods for use manipulating handwritten objects in a database.

Further, although the invention has been described in terms of handwritten input patterns, it is envisioned that the documents may be represented by speech objects, i.e., the title of each document stored in the database may be a spoken word or phrase. During retrieval, a spoken input sequence is compared to the document titles input during insertion of each document in to the database.

Although the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A method for indexing a plurality of handwritten objects in a database, the method comprising the steps of:
    (a) generating a B-tree data structure of order m, where m is an integer, the B-tree having a plurality of nodes divided into a plurality of levels ordinally numbered $0^{th}$ through $n^{th}$, each node in the $0^{th}$ level being a leaf, each node in the $1^{th}$ level having at least m/2 leaves as children;
    (b) assigning each one of the handwritten objects to a respective leaf;
    (c) associating a respectively different hidden Markov model (HMM) with each respective child of each of the nodes in the $1^{th}$ to $n^{th}$ levels, each one of the nodes in the $1^{th}$ to $n^{th}$ levels containing the respective HMMs associated with the children of the one node;
    (d) training each HMM in each one of the nodes in the $1^{th}$ level to accept the handwritten object assigned to the leaf that is the child with which the HMM is associated; and
    (e) training the respective HMMs in each node in a path from a root node of the B-tree to one of the nodes in the $1^{th}$ level, so that each HMM associated with any of nodes in the path accepts all of the handwritten objects in the leaves of a subtree that has as a root the respective child with which the HMM is associated, wherein step (e) is executed each time an object is added to the database.

2. A method according to claim 1, further comprising a step of adding a further handwritten object to the B-tree, including the steps of:
    (1) training a further HMM to accept the further handwritten object;
    (2) selecting the node in the $n^{th}$ level
    (3) executing, for each level from the $n^{th}$ level to the $2^{th}$ level, the steps of:
        (a) running each HMM in the selected node against the further handwritten object,
        (b) identifying the HMM that outputs a highest probability value during execution of step (3)(a),
        (c) selecting the node that is a child of the identified HMM; and
    (4) inserting the further HMM in the selected node in the $1^{th}$ level, if the selected node in the $1^{th}$ level has fewer than m children.

3. A method according to claim 2, further comprising the step of retraining the respective HMMs in each node in a path from a root node of the B-tree to the selected node in the $1^{th}$ level, so that each HMM associated with any of nodes in the path accepts all of the handwritten objects in the leaves of a subtree that has as a root the respective child with which the HMM is associated.

4. A method according to claim 3, further comprising searching the index, comprising the steps of:
    (f) selecting the node in the $n^{th}$ level;
    (g) executing, for each $k^{th}$ level, for values of k from n to 1, the steps of:
        (1) running the respective HMMs of each selected node in $k^{th}$ level against the sequence of input data,
        (2) selecting each one of the nodes in the $k-1^{th}$ level for which the associated HMM has an output probability greater than a threshold value, and
    (h) identifying the handwritten object in at least one of the leaves as matching the sequence of input data if the leaf is selected.

5. A method according to claim 2, further comprising the step of:
    (5) adding a further node in the $1^{th}$ level if the selected node in the $1^{th}$ level has m children, comprising the steps of:
        (a) inserting a node in the $1^{th}$ level,
        (b) associating half of the HMMs in the selected node in the $1^{th}$ level with the inserted node, and
        (c) making a parent node of the selected node in the $1^{th}$ level a parent of the inserted node, if the parent node has fewer than m children.

6. A method according to claim 5, further comprising the step of retraining the respective HMMs in each node in a path from a root node of the B-tree to the inserted node in the $1^{th}$ level, so that each HMM associated with any of nodes in the path accepts all of the handwritten objects in the leaves of a subtree that has as a root the respective child with which the HMM is associated.

7. A method according to claim 6, further comprising the step of retraining the respective HMMs in each node in a further path extending from the root node of the B-tree to the selected node in the $1^{th}$ level, so that each HMM associated with any of nodes in the further path accepts all of the handwritten objects in the leaves of a subtree that has as a root the respective child with which the HMM is associated.

8. A method according to claim 5, further comprising the step of:

(6) splitting the parent node of the selected node into two nodes in the $2^{th}$ level if the parent node has m children prior to executing step (5)(c), wherein a first one of the two nodes is the parent of the selected node, and a second one of the two nodes is the parent of the inserted node.

9. A method according to claim 8, further comprising the step of retraining the respective HMMs in each node in a path from a root node of the B-tree to the selected node in the $1^{th}$ level, so that each HMM associated with any of nodes in the path accepts all of the handwritten objects in the leaves of a subtree that has as a root the respective child with which the HMM is associated.

10. A method for matching a sequence of input data to one of a plurality of handwritten objects, the method comprising the steps of:

(a) generating a B-tree data structure of order m, having a plurality of nodes divided into a plurality of levels ordinally numbered $0^{th}$ through $n^{th}$, each node in the $0^{th}$ level being a leaf, each node in the $1^{th}$ level having at least m/2 leaves as children;

(b) assigning each one of the handwritten objects to a respective leaf;

(c) associating a respectively different hidden Markov model (HMM) with each child of each one of the nodes in the $1^{th}$ to $n^{th}$ levels, each one of the nodes in the $1^{th}$ to $n^{th}$ levels containing the respective HMMs associated with the children of the one node;

(d) training the HMMs contained in each one of the nodes in the $1^{th}$ level to accept the handwritten objects of the respective leaves that are children of the one node;

(e) training each HMM contained in any of nodes in the $2^{th}$ through $n^{th}$ levels to accept all of the handwritten objects in the leaves of a subtree that has as a root the respective child with which the HMM is associated;

(f) selecting the node in the $n^{th}$ level;

(g) executing, for each $k^{th}$ level, for values of k from n to 1, the steps of:

(1) running the respective HMM of each selected node in $k^{th}$ level against the sequence of input data, (2) selecting each one of the nodes in the k–$1^{th}$ level for which the associated HMM has an output probability greater than a threshold value, and (h) identifying the handwritten object in at least one of the leaves as matching the sequence of input data if the leaf is selected.

11. A method for indexing a plurality of handwritten objects, comprising the steps of:

(a) generating a B-tree data structure of order m, having a plurality of nodes divided into a plurality of levels ordinally numbered $0^{th}$ through $n^{th}$, each node in the $0^{th}$ level being a leaf, each node in the $1^{th}$ level having a respective leaf as a child;

(b) assigning one of the handwritten objects to a first one of the leaves;

(c) associating a hidden Markov model (HMM) in the $1^{th}$ level with the first leaf;

(d) training the HMMs in the $1^{th}$ and $2^{th}$ levels to accept the handwritten object of the first leaf;

(e) adding a further handwritten object to the B-tree, including the steps of:

(1) training a further HMM to accept the further handwritten object;

(2) selecting the node in the $n^{th}$ level;

(3) executing, for each level from the $n^{th}$ level to the $2^{th}$ level, the steps of:

(a) running each HMM in the selected node against the further handwritten object, (b) identifying the HMM that outputs a highest probability value during execution of step (3)a, (c) selecting the node that is a child of the identified HMM; and (4) inserting the further HMM in the selected node in the $1^{th}$ level, if the selected node in the $1^{th}$ level has fewer than m children;

(5) adding a further node in the $1^{th}$ level if the selected node in the $1^{th}$ level has m children, comprising the steps of:

(a) inserting a node in the $1^{th}$ level, (b) associating half of the HMMs in the selected node in the $1^{th}$ level with the inserted node, and (c) making a parent node of the selected node in the $1^{th}$ level a parent of the inserted node.

12. Apparatus for indexing a plurality of handwritten objects in a database, comprising:

means for monitoring movement of a stylus that forms a handwritten pattern, and for generating therefrom a plurality of symbols which form the handwritten objects;

means for storing a B-tree data structure of order m, where m is an integer, the B-tree having a plurality of nodes divided into a plurality of levels ordinally numbered $0^{th}$ through $n^{th}$, each node in the $0^{th}$ level being a leaf, each node in the $1^{th}$ level having at least m/2 leaves as children;

means for assigning each one of the handwritten objects to a respective leaf;

means for associating a respectively different hidden Markov model (HMM) with each respective child of each of the nodes in the $1^{th}$ to $n^{th}$ levels, each one of the nodes in the $1^{th}$ to $n^{th}$ levels containing the respective HMMs associated with the children of the one node;

means for training each HMM in each one of the nodes in the $1^{th}$ level to accept the handwritten object assigned to the leaf that is the child with which the HMM is associated; and means for training each HMM associated with any of the nodes in the $2^{th}$ through $n^{th}$ levels to accept all of the handwritten objects in the leaves of a subtree that has as a root the respective child with which the HMM is associated.

* * * * *